FIG. IA
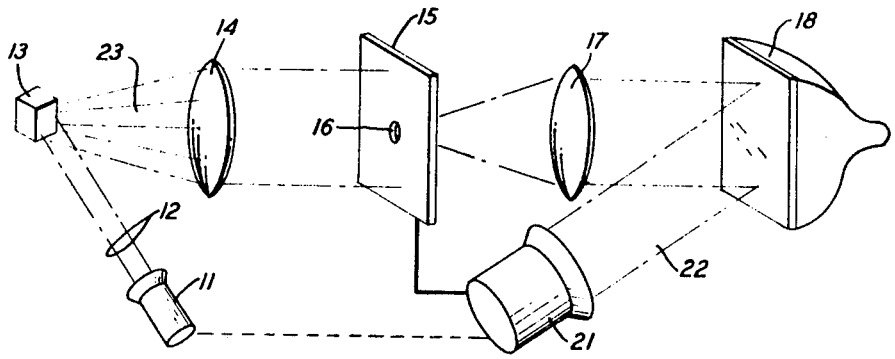
FIG. IB
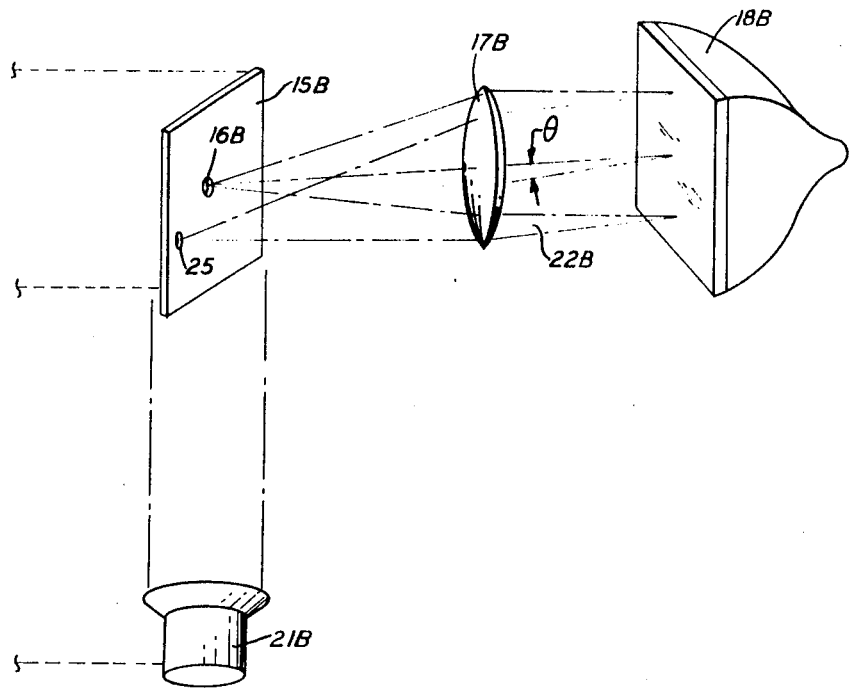
INVENTORS R. J. COLLIER
K. S. PENNINGTON
BY
Roderick B Anderson
ATTORNEY

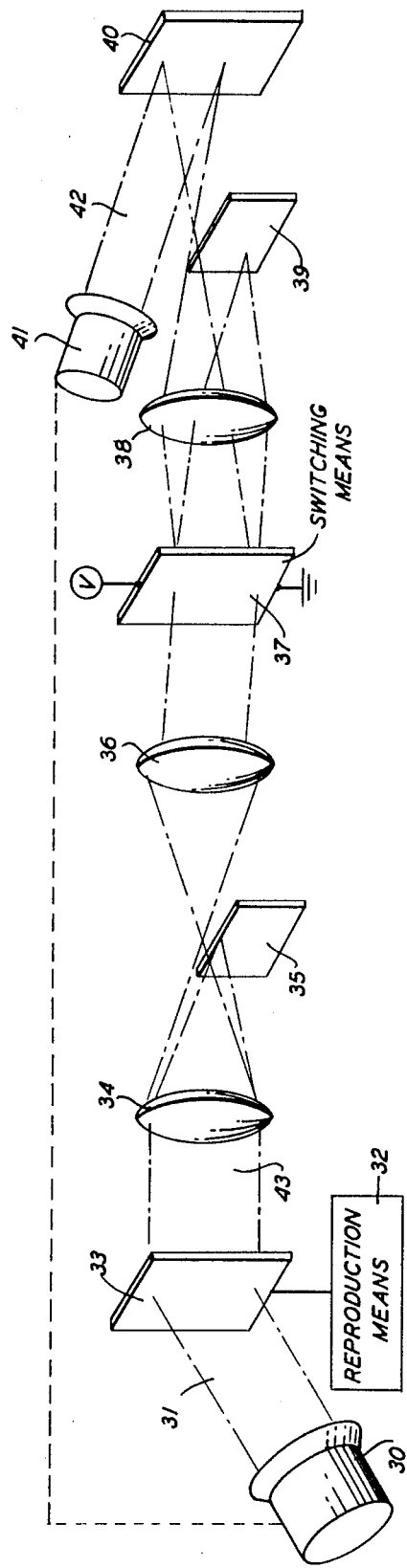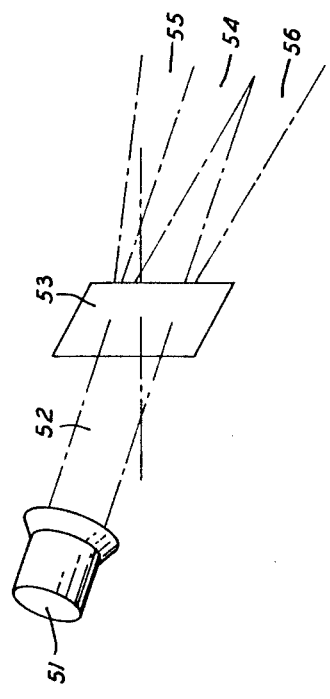

3,516,721
SAMPLING TECHNIQUES FOR HOLOGRAMS
Robert J. Collier, New Providence, N.J., and Keith S. Pennington, Putnam Valley, N.Y., assignors to Bell Telephone Laboratories, Incorporated, Murray Hill and Berkeley Heights, N.J., a corporation of New York
Filed Mar. 13, 1968, Ser. No. 712,828
Int. Cl. G02b 27/00
U.S. Cl. 350—3.5                                5 Claims

ABSTRACT OF THE DISCLOSURE

Methods are disclosed for sampling the information in a high spatial frequency Fourier transform plane to produce holograms of low spatial frequency. In each case the low frequency holograms are produced by projecting each sampled beam and reference light onto a recording medium in such a way that there is only a small constant angle between the sampled beam and the reference light. A technique is also disclosed for reconstructing the original information.

BACKGROUND OF THE INVENTION

When an object is illuminated, it modulates the illuminating beam so as to form a beam of light that carries information representative of the object. A record, called a hologram, can be made of the phase and amplitude of this information-bearing beam by interfering on a recording medium, such as a photographic plate, the wavefronts of the information beam and a reference beam. If the angle between the information and reference beams is large enough, proper illumination of the hologram reconstructs therefrom three beams. One of these beams contains no information that can be readily used. The other two are reconstructions of the stored information-bearing beam and its conjugate, which reconstruct virtual and real images of the stored object.

It has frequently been desirable to transfer the holographic record from its place of formation to a different location for reconstruction. This transfer might be accomplished by making an electromagnetic record of the interference pattern, transmitting the electromagnetic signal, receiving it at the reconstruction point and using it there to form a hologram that would be illuminated for reconstruction. The possibilities of holographic facsimile and television immediately suggest themselves.

However, as is known in the art, the holographic interference patterns that record the information associated with three-dimensional objects are often so dense, having from 200 to 1200 lines per millimeter, that problems arise in storing and transmitting such holograms. As explained by K. S. Pennington in "How to Make Laser Holograms," Microwaves, p. 35 (October 1965), when the information beam is centered on the normal to the recording medium, the number of interference fringes per unit distance on the recording medium, which is called the spatial frequency of the fringes, is directly related to the sines of the angles that the reference beam and the various parts of the information beam make with the normal to the recording medium. With complex objects, such as those of three dimensions, a wide variety of wavefronts associated with the object are incident on the recording medium. Because there is a wide variation in the angles at which these wavefronts are incident on the recording medium, there are large angles between at least some of the wavefronts and those wavefronts propagating along the normal to the recording medium; and as a result, even the minimum range of the spatial frequencies of the fringes that are formed is relatively high. Consequently, complex objects are said to have a high spatial frequency content.

For convenience in the discussion that follows below, W is assumed to be the spatial frequency of the fringes formed by that part of the information beam that has the largest angle between it and the normal to the recording medium; and because the fringes have both negative and positive spatial frequencies, the range of frequencies is therefore from $-W$ to $+W$. Because the frequencies of the fringes depend on the angles of incidence of the wavefronts in the information beam, it can also be said that the information beam contains a range of spatial frequencies from $-W$ to $+W$.

To separate the three beams formed when a hologram is illuminated, there must be a minimum angle between the reference beam and the information beam. The sine of this minimum angle is three times the sine of the largest angle between any part of the information beam and the normal to the recording medium. As is more fully explained in the aforementioned article by K. S. Pennington, the result of this is that the spatial frequencies of the fringes range from $-4W$ to $+4W$, which is four times the minimum range referred to above. Moreover, the fringes that contribute to the reconstruction of the information beam and its conjugate have spatial frequencies ranging from two to four times the minimum range, that is, from $-4W$ to $-2W$ and from $+2W$ to $+4W$. High spatial frequencies, however, can be recorded or scanned only with recording or scanning devices that have a high resolution.

Because the transmission bandwidth of a hologram is directly related to the maximum spatial frequency that is transmitted, the transmission bandwidth required to transmit a hologram with high spatial frequency fringes is ordinarily quite high. As a result of this and other considerations pointed out by Leith and others in "Requirements for a Wavefront Reconstruction Television Facsimile System," Journal of the Society of Motion Picture and Television Engineers, 74, 893 (October 1965), the transmission bandwidth required for holographic TV is at present several orders of magnitude greater than the present TV channel bandwidth.

SUMMARY OF THE INVENTION

Accordingly, it is an object of our invention to simplify the recording and scanning of a hologram.

It is a further object of our invention to simplify the recording and scanning of a hologram of an object having a high spatial frequency content.

It is still a further object of our invention to reduce the spatial frequency of the fringe patterns that comprise a hologram and so to reduce the transmission bandwidth required to transmit a hologram.

And it is yet another object of our invention to reduce the resolution required to record and scan and the bandwidth required to transmit enough of a hologram of an object having a high spatial frequency content to permit a reasonably faithful reconstruction of an image of the object.

These and other objects of our invention are accomplished by sampling the spatial frequencies in the information-bearing beam and producing low spatial frequency holograms of these samples. The angular spread of the information-bearing wavefronts recorded at any one time is greatly reduced by forming the Fourier transform of the information beam, sampling this beam and processing it by one of the methods described below. Typically, the transform is made by placing the object that is illuminated to form the information beam in the front focal plane of a lens, in which case the transform of the information beam is located in the rear focal plane of the lens; and the sampling is accomplished by an aperture in an opaque screen located in the rear focal plane, or Fourier transform plane, of the lens.

From geometrical optics, it is clear that the wavefronts focused to a given point in the Fourier transform plane are all substantially parallel before incidence on the focusing lens. In other words, the wavefronts incident on a given point in the transform plane all travel in the same direction before said incidence on the lens and hence have the same spatial frequency. From geometrical optics, it is also clear that if the Fourier transform plane is located in the front focal plane of a second lens, those wavefronts that go through the aperture are rendered substantially parallel by the second lens and have a direction, and hence a spatial frequency, that is directly related to their direction before incidence on the first lens. In other words, the effect of the second lens is to take the inverse Fourier transform of any sample of the Fourier transform, a process that reconstructs a beam having those spatial frequencies that are sampled in the Fourier transform plane.

From the discussion above on the formation of fringes, it should also be apparent that if the substantially parallel wavefronts from the second lens interfere on an appropriate medium with a suitable reference beam, it is possible to form low frequency fringes. Regardless of the spatial frequency of the wavefronts before incidence on the first lens, the range of spatial frequencies in the sampled beam is small. Because the angle between the reference beam and the sampled beam depends on the range of spatial frequencies in the sampled beam, this angle can be small; and the fringes that are formed have a low spatial frequency. Consequently, the need for high resolution scanning techniques is greatly reduced. Because the bandwidth requirements are directly related to the spatial frequency, the bandwidth requirements for storing and transmitting the holographic information are also reduced. However, the resolution of the image reconstructed from a single low frequency hologram is relatively poor. To improve the quality of this image it is advantageous to sample the Fourier transform at several different locations, thereby obtaining samples of wavefronts of several different spatial frequencies, and to make low frequency holograms of all these samples.

Thus, in one embodiment of our invention, an information-bearing beam formed by illuminating an object is directed by a converging lens onto an opaque screen situated in the Fourier transform plane of the lens. A sampling aperture in this screen samples the spatial frequencies of the information beam by transmitting only those wavefronts that are focused on the aperture. Because the aperture is also situated in the front focal plane of a second Fourier-transforming lens, the wavefronts that transit the aperture are so refracted by the second lens that they are rendered substantially parallel. These wavefronts are then incident on a recording medium where they interfere with a reference beam. Because the angles between the information-bearing wavefronts and the reference beam are quite small, the resulting interference pattern has a low enough spatial frequency that it can be electronically scanned by low resolution equipment and transmitted by a transmission system having relatively low bandwidth capabilities.

After this first interference pattern is scanned, the sampling aperture is moved to another position so as to sample wavefronts having other spatial frequencies. At the same time, the reference beam is moved so that the same low angles will exist between the reference beam and the wavefronts of the sampled information beam as existed in the previous recording even though the spatial frequencies of the wavefronts are different. Again the resulting interference pattern is scanned and transmitted. And this procedure is repeated until the entire aperture plane has been sampled at enough positions to record wavefronts having as many different spatial frequencies as are needed to reconstruct a good quality image of the object that was illuminated.

The number of samples required will, of course, vary with the size of the aperture and the desired quality of the image that is reconstructed. One sampling ratio is disclosed in the copending, concurrently-filed application of L. H. Lin entitled "Information Reduction by Fourier Transform Sampling," U.S. patent application Ser. No. 712,838, filed Mar. 13, 1969, and assigned to Bell Telephone Laboratories, Incorporated. There the total area of the samples is approximately $1/1000$ the area of that part of the Fourier transform plane that is sampled. Although the sampling achieved in the aforementioned application of L. H. Lin is attained in part by sacrificing vertical parallax in the reconstructed image, even vertical parallax could be preserved if the area of an appropriately arranged set of samples is $1/100$ the area of the portion of the Fourier transform plane that is sampled.

At the reconstruction point, the electronic signals representative of the interference patterns of the samples of the information beam arrive sequentially. The signals are then processed to derive from them the information needed to create a single high spatial frequency interference pattern from which can be reconstructed the equivalent of the original information-bearing beam. The information in each signal is obtained by recreating from the signal its low spatial frequency interference pattern and by illuminating this pattern with a laser beam. This reconstructs low spatial frequency wavefronts that are the equivalent of the original sample of the information beam. The reconstructed wavefronts are then given the same high spatial frequency of the original sample by sending them through an optical switch that directs the reconstructed wavefronts onto a recording medium at the same angle the sampled wavefronts of the original information-bearing beam would have had if the wavefronts had gone unrefracted from the object that was illuminated to the recording medium. In other words, the optical switch puts the reconstructed wavefronts back on the same spatial frequency the original sampled wavefronts had before incidence on the first lens in the initial recording process.

On the recording medium, a second interference pattern is formed by interfering the reconstructed information-bearing wavefronts with a reference beam. All the holograms transmitted are processed in like fashion, each set of reconstructed wavefronts being directed by the optical switch onto the recording medium at its original spatial frequency; and the resultant interference pattern is equivalent to the high spatial frequency pattern produced in the prior art by interfering an information-bearing beam with a reference beam. Consequently this high spatial frequency interference pattern can, in turn, be illuminated to reconstruct enough of the original information beam to view an image of the original object.

An illustrative example of how this embodiment of the invention affects the spatial frequency of the interference fringes of a hologram, and hence its bandwidth, may help in understanding the invention. If the minimum spatial frequency of the fringes formed by interfering an information beam and a reference beam is W and if the three beams formed during reconstruction are to be separable, then the angle between the two beams during formation must be large enough that the frequency of the fringes be 4W. However, by sampling the Fourier transform so that the minimum spatial frequency of the fringes formed by interfering each sample with a reference beam is $W/1000$, then to separate the three beams during reconstruction the angle between the two beams during formation need only be large enough that the frequency of the fringes be $4W/1000$. It is, of course, considerably easier to scan fringes with a frequency of $4W/1000$ than fringes with a frequency of 4W. Moreover, the sum of the bandwidths of all the samples taken need not be 4W because an acceptable image of the object can be reconstructed from considerably less than 1000 different samples of the Fourier transform. Hence the bandwidth of the samples can also be reduced.

BRIEF DESCRIPTION OF THE DRAWING

These and other objects and features of our invention will be more readily understood from the following detailed description taken in conjunction with the accompanying drawing in which:

FIG. 1A is a schematic illustration of apparatus used to sample a hologram in one embodiment of our invention;

FIG. 1B is a schematic illustration of alternative apparatus that can be used in place of some of the apparatus of FIG. 1A;

FIG. 2 is a schematic illustration of part of the apparatus used to reconstruct an image stored in holograms sampled by the apparatus of FIGS. 1A or 1B; and FIG. 3 is a schematic illustration of a second part of the apparatus used to reconstruct an image stored in holograms sampled by the apparatus of FIGS. 1A or 1B.

DETAILED DESCRIPTION

Referring now to FIG. 1A, there is shown an illustrative embodiment of one feature of applicants' invention. The apparatus comprises a coherent light source 11 from which emanates an object beam 12, a three-dimensional object 13 about which information is to be stored, a lens 14 so situate that object 13 is in its front focal plane, an opaque medium 15 situated in the rear focal plane of lens 14 and movable in that plane, a second lens 17 so situated that medium 15 is located in its front focal plane, a recording medium 18, such as a camera tube, situated in the rear focal plane of lens 17, and a second coherent light source 21 from which emanates a reference beam 22. In opaque medium 15 is an aperture 16, typically no less than one and no more than a few millimeters wide, through which light may be transmitted. Medium 15, and hence aperture 16, is mechanically connected to light source 21 so that whenever aperture 16 is moved in the focal plane the position of source 21 and therefore beam 22 is also moved, thereby maintaining a constant angle between beam 22 and the light transmitted through aperture 16 and lens 17. Because reference beam 22 should be phase related to object beam 12, it is best to use a system of beam splitter and mirrors to derive reference beam 22 from object beam 12. However, to avoid undue complication of FIG. 1A, the common origin of the two beams is indicated merely by a dotted line between source 11 and source 21.

To form and sample a set of interference fringes containing information about object 13, information-bearing modulated beam 23 is created by reflecting object beam 12 from object 13. Beam 23 is then incident on lens 14 that forms on opaque medium 15 the Fourier transform of beam 23. Consequently, except in the region of aperture 16, the light reflected by object 13 is stopped. However, the Fourier transform of beam 23 in the region of aperture 16 transits the rear focal plane and is next incident on lens 17 that forms on recording medium 18 the inverse Fourier transform of the Fourier tansform sampled by aperture 16. The inverse transform is, of course, a sample of information-bearing beam 23; and as explained above, the wavefronts in the inverse transform are all substantially parallel. On medium 18 these wavefronts interfere with reference beam 22 to form a set of low frequency interference fringes that is recorded thereon. For the lowest useful fringe frequency, the angle between the sampled wavefronts and the reference beam should be the minimum angle that permits separation of the beams produced when the fringes are illuminated. Medium 18 can be as simple as a photographic plate, but for our illustrative example it is assumed to be a TV camera tube that scans the interference fringes to form an electromagnetic signal representative of them. This signal is then transmitted to the point where an image of object 13 is to be observed.

After an electronic record is made of this interference pattern, an interference pattern is made of another sample of spatial frequencies in information-bearing beam 23. This is readily done by altering the position of aperture 16 in the rear focal plane of lens 14. For example, if the total area of the sampled portions of the Fourier transform is to be 1/100 the area of the portion of the Fourier transform plane that is sampled, aperture 16 is moved in the vertical or horizontal direction a distance equal to ten times the width of the aperture in the direction moved. At the same time that the position of aperture 16 is changed, the position of light source 21 is also changed because of the mechanical connection between aperture 16 and source 21; and as a result the angle between the second sample of the spatial frequencies in information-bearing beam 23 and reference beam 22 is substantially the same as the angle between the first sample and reference beam 22.

To form a hologram of the second sample of the spatial frequencies in beam 23, coherent light is now directed from light source 11 onto object 13 through lens 14 whence it is reflected onto opaque medium 15. That part of the light in the region of aperture 16 transits medium 15, is refracted by lens 17 and interferes at medium 18 with reference beam 22. As with the set of interference fringes of the first sample, this second set is scanned and transmitted. And this procedure is repeated for as many samples as are necessary to produce at the receiving end a hologram that gives a satisfactory reconstruction of object 13.

Referring now to FIG. 1B, there is shown alternative means for connecting the position of reference beam 22 to the position of aperture 16 comprising an opaque medium 15B in which is an aperture 16B, a lens 17B so situated that medium 15B is located in its front focal plane, a recording medium 18B and a light source 21B, all of which elements have like numbered equivalents in FIG. 1A, and a small spherical mirror 25 situated on an otherwise non-reflecting surface of medium 15B facing lens 17B. Just as medium 15 of FIG. 1A is situated in and movable in the rear focal plane, or Fourier transform plane, of the lens 14 that forms the Fourier transform of object 13, so too medium 15B is situated in and movable in the Fourier transform plane of the lens (not shown) that forms the Fourier transform of the object (not shown).

In operation, collimated light is directed from source 21B to the plane in which medium 15B is moved so that the light is incident on the surface of medium 15B facing lens 17B; and the diverging light reflected by spherical mirror 25 to lens 17B is rendered parallel by lens and directed onto recording medium 18B as a low angle reference beam 22B. Because the angle $\theta$ at recording medium 18B between reference beam 22B and the median wavefront of the sampled wavefronts that pass through aperture 16B is directly related to the distance between mirror 25 and aperture 16B on medium, 15B, the angle can be made as small as desired simply by decreasing the distance between mirror 25 and aperture 16B. And in particular, no matter what the range of spatial frequencies in the sampled wavefronts that pass through the aperture, the angle $\theta$ can be made small enough so that the spatial frequency of the reference beam with respect to the median wavefront is only three times as large as the maximum spatial frequency of the sampled wavefronts with respect to the median wavefront.

Moreover, the angle $\theta$ can be kept constant as medium 15B is moved in the Fourier transform plane to sample other spatial frequencies provided spherical mirror 25 is not moved out of the collimated light from source 21B. As long as the angle of incidence of the light from source 21B on mirror 25 is the same, as it is no matter where mirror 25 is moved in the focal plane provided it is kept within the collimated beam, the diverging light beam from mirror 25 is the same. Because the distance between mirror 25 and aperture 16B is fixed, the angle at lens 17B between the diverging light from mirror 25 and the sample wavefronts that transit aperture 16B is constant. And from this it can be shown that the angle $\theta$ at recording medium 18B is also constant.

Referring now to FIG. 2, there is detailed the apparatus used to produce a hologram from which is reconstructed a satisfactory image of the object recorded with the apparatus of either FIG. 1A or FIG. 1B. This apparatus comprises a coherent light source 30, a reproduction means 32, a display medium 33, a lens 34 so situated that medium 33 is in its front focal plane, a half-plane stop 35 situated in the rear focal plane of lens 34, a second lens 36 so situated that stop 35 is located in its front focal plane, optical switching means 37 such as an electro-optic or an acousto-optic device, a third lens 38, a stop 39 located in the rear focal plane of lens 38, a recording medium 40 and a second coherent light source 41. Because a reference beam 42 emanating from source 41 should be phase related to an illuminating beam 31 emanating from source 30, it is best to use a system of beam splitter and mirrors to derive reference beam 42 from light beam 31. However, to avoid undue complication of FIG. 2, the common origin of the two beams is indicated by a dotted line between source 31 and source 41.

As the electromagnetic signal representative of the interference pattern of each sampled beam is received, the interference pattern is displayed on medium 33 by reproduction means 32. This display can be accomplished by any one of several techniques known in the art. For example, as described by L. H. Enloe and others in "Hologram Transmission via Television," Bell System Technical Journal, 45, p. 335, (February 1966), the interference pattern can be reproduced from its electromagnetic signal by scanning the signal onto the surface of a cathode ray tube. And a photographic record of this display is a suitable display medium. Alternatively, as described in the copending application of L. H. Enloe et al., Ser. No. 635,124, filed May 1, 1967, the electromagnetic signal can be used to modulate a beam of electrons that are scanned across a thermoplastic medium. In such a case, the record formed on the thermoplastic medium is representative of the interference pattern, and the thermoplastic medium is a suitable display medium.

In either event, the display medium is then illuminated by light beam 31 emanating from coherent light source 30. The interference pattern on medium 33 diffracts and thereby modulates light from light beam 31 to form an information-bearing, modulated light beam sample 43 that is the optical equivalent of the sampled beam used in FIG. 1 to form the interference pattern on recording medium 18. Because of the position of lenses 34 and 36 of FIG. 2, lens 34 forms the Fourier transform of beam 43 and lens 36 forms the inverse Fourier transform of the transform formed by lens 34. Between lenses 34 and 36, a half-plane stop 35 is located so that it is in the rear focal plane of lens 34 and the front focal plane of lens 36. So situated, stop 35 blocks that part of light beam 32 that is not diffracted by the interference pattern on medium 33.

Beam 43 is then switched by, for example, appropriate voltages applied to optical switching means 37. Many such switching means, capable of deflecting a beam in both the horizontal and the vertical directions, are well known in the art and will not be described further. For example, further details about electro-optic switching means may be obtained from U.S. Pat. No. 3,357,771, entitled "Light Beam Deflector Employing Electro-Optic Crystal"; and additional information about acousto-optic switching means is available in Robert Adler's "Interaction Between Light and Sound," I.E.E.E. Spectrum, 4, 42 (May 1967), and the references cited therein.

Means 37 changes the direction of beam 43 as described below, after which the beam transits another lens 38 and is incident on recording medium 40. There it interferes with a reference beam 42 emanating from light source 41, and the resulting interference pattern is recorded on medium 40. Between lens 38 and recording medium 40, a half-plane stop 39 is located so that it is in the rear focal plane of lens 38. So situated, stop 39 blocks that part of the light beam that is not redirected by switching means 37.

The above procedure is repeated for the interference pattern of each sampled beam as the pattern is received at the reconstruction point. And as a result, a series of beam samples 43 is projected through the apparatus of FIG. 2, is redirected by switching means 37 and is incident on recording medium 40. From what has been explained above, it should be apparent that each beam sample 43 formed by illuminating an interference pattern displayed on medium 33 is the optical equivalent of the sampled wavefronts used in FIG. 1A, or FIG. 1B, to form on recording medium 18, or 18B, the interference pattern now displayed on medium 33.

Because the angle between the sampled wavefronts and the reference beam in FIG. 1A, or 1B, is substantially the same during the recording of the interference pattern of each sample, each information-bearing beam sample 43 is projected in the same direction when display medium 33 is illuminated. However, for each sample taken from a different point in the rear focal plane of lens 14 of FIG. 1A, the amount of deflection by switching means 37 is varied in order to place the reconstructed beam sample back on the same spatial frequency its equivalent sampled wavefronts had before incidence on lens 14 in the recording process detailed in conjunction with FIGS. 1A and 1B. This is done by applying to switching means 37 the voltages required to deflect an information-bearing modulated beam sample 43 so that the angle at recording medium 40 between beam 43 and reference beam 42 is the same as the angle would have been between each set of sampled wavefronts of information beam 23 and reference beam 22 of FIG. 1A if beam 23 has gone unrefracted from the illuminated object 13 to recording medium 18 and if reference beam 22 had been fixed in one position and not coupled to the position of aperture 16.

As a result, the properly deflected beam samples and reference beam 42 ultimately form on recording medium 40 a composite interference pattern from which can be reconstructed a satisfactory image of object 13. This reconstruction is achieved simply by developing and fixing recording medium 40 and then illuminating it with a coherent light beam following techniques well known in the art. Apparatus suitable for such illumination is shown in FIG. 3. The developed recording medium, which constitutes a hologram, is shown as element 53. It is illuminated by a coherent light beam 52 projected from light source 51. As with the usual holograms formed by sufficiently separate reference and information beams, three beams of light are projected from the illuminated hologram. Beam 54 is an undiffracted beam traveling, of course, in the same direction as beam 52. Beams 55 and 56, however, are diffracted, information-bearing beams, one of which reconstructs a virtual image of object 13 and the other of which reconstructs a real image.

The underlying theory of this embodiment has been explained in the summary of the invention. Because high frequency holograms are difficult to scan and require large spatial frequency bandwidths for storage and transmission, low frequency holograms are formed. The object is illuminated and the Fourier transform of the resultant beam is made. The Fourier transform is then sampled at several locations, and a separate hologram is made of the inverse Fourier transform of each sample. At the point of reconstruction a composite hologram is then made from all the sampled holograms. Finally, the composite hologram is illuminated to form an information-bearing beam that reconstructs an image of the object stored in the hologram.

As is obvious to those skilled in the art the above described embodiment is merely illustrative of our invention for several modifications can be made. For example, rather than move the aperture in the Fourier transform plane as is done in FIG. 1A, the Fourier transform can be scanned across the aperture by any suitable deflection means. Similarly, rather than move a single reference beam in step with the motion of the aperture, an array of reference beams can be used in conjunction with either a sequential sampling of the Fourier transform or a simultaneous sampling. In the case of sequential sampling, the mask has a single aperture as in FIG. 1 and the particular reference beam used for any exposure varies with the location of the aperture so that the angle between the reference beam and the information-bearing beam is always as small as the minimum angle required to produce separate beams upon reconstruction. In the case of simultaneous sampling, the mask has as many apertures as there are samples to be taken and behind each aperture are the optical elements required to form the hologram of the inverse Fourier transform of the sample. Typically, these elements are a lens located so that the aperture is in its front focal plane, a recording medium located in the rear focal plane of the lens and a reference beam light source. As in the case of sequential sampling, the angle between each reference beam and sampled information-bearing beam is the minimum required to produce separate beams upon reconstruction.

For any of these modifications, the two step process shown in FIGS. 2 and 3 will reconstruct an image of the original object. Each sampled hologram is displayed sequentially by the apparatus of FIG. 2, and a composite hologram is formed from the samples. The composite is then viewed to see the reconstructed image.

Many other modifications will be obvious that do not depart from the spirit and scope of this invention.

What is claimed is:
1. A method of recording on a hologram information representative of an object comprising the steps of:
   illuminating the object with a first beam of coherent light to form an information bearing beam;
   forming a Fourier transform of the information-bearing beam;
   sampling the Fourier transform at several locations in the Fourier transform plane so as to select a small number of spatial frequencies;
   projecting each sample of the information-bearing beam and a coherent reference beam of light having a constant phase relation with said first beam onto a recording medium, a substantially identical angle being maintained between each sample and the reference beam at each point on the recording medium, thereby forming a set of interference fringes for each sample.
2. The method of claim 1 wherein the Fourier transform is sampled sequentially.
3. The method of claim 2 wherein an identical angle is maintained between the reference beam and each sample by slaving the position of the reference beam to the position of the Fourier transform sample.
4. The method of claim 1 wherein each sample projected onto a recording medium is the inverse Fourier transform of the sampled Fourier transform.
5. The method of recording on a hologram and reconstructing therefrom information representative of an object comprising the steps of:
   illuminating the object with a first beam of coherent light to form an information-bearing beam;
   forming a Fourier transform of the information-bearing beam;
   sequentially sampling the Fourier transform at several locations in the Fourier transform plane so as to select a small number of spatial frequencies;
   projecting onto a recording medium a second beam of coherent light having a constant phase relation with said first beam and the inverse Fourier transform of each sample of the Fourier transform of the information beam, substantially identical low angles being maintained between the second beam of light and each sample, thereby forming a set of low spatial frequency interference fringes for each sample of the information beam;
   illuminating with a third beam of coherent light a record of each set of interference fringes to reconstruct a second information-bearing beam for each set of interference fringes;
   projecting each of the second information-bearing beams onto a recording medium at an angle representative of the position of its related sample in the Fourier transform and interfering each second information beam with a fourth beam of coherent light having a constant phase relation with said third beam to form a set of high spatial frequency interference fringes; and
   illuminating the set of high spatial frequency interference fringes to reconstruct a third information-bearing beam in which can be observed an image of the object.

References Cited

Kock, Proc. of the IEFE, vol. 55, June 1967, pp. 1103–4.

McCrickerd et al., Applied Physics Letters, vol. 12, No. 1, January 1968, pp. 10–12.

DAVID SCHONBERG, Primary Examiner

R. J. STERN, Assistant Examiner

U.S. Cl. X.R.

178—6, 6.8